United States Patent
Ikeda et al.

(10) Patent No.: US 6,565,096 B2
(45) Date of Patent: May 20, 2003

(54) LIP TYPE SEAL

(75) Inventors: Yasuhiro Ikeda, Takahashi (JP); Takeshi Yamada, Kariya (JP); Takayuki Imai, Kariya (JP)

(73) Assignees: Eagle Industry Co., Ltd., Tokyo (JP); Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/810,330

(22) Filed: Mar. 19, 2001

(65) Prior Publication Data
US 2001/0033058 A1 Oct. 25, 2001

(30) Foreign Application Priority Data
Mar. 17, 2000 (JP) ......................................... 2000-075275

(51) Int. Cl.[7] ................................................. F16J 15/32
(52) U.S. Cl. ........................ 277/551; 277/562; 277/572; 277/577
(58) Field of Search ................................. 277/549, 550, 277/551, 553, 555, 558, 561, 562, 564, 569, 570, 572, 573, 574, 575, 576, 577

(56) References Cited

U.S. PATENT DOCUMENTS

| | | | | |
|---|---|---|---|---|
| 2,202,908 A | * | 6/1940 | Hubbard | 277/555 |
| 2,264,148 A | * | 11/1941 | Fisher, Jr. et al. | 277/555 |
| 2,310,405 A | * | 2/1943 | Dodge | 277/529 |
| 3,771,799 A | * | 11/1973 | Sekulich et al. | 277/346 |
| 4,325,591 A | * | 4/1982 | Otto | 277/551 |
| 4,428,587 A | * | 1/1984 | Forch | 277/424 |
| 4,623,153 A | * | 11/1986 | Nagasawa | 277/551 |
| 4,822,059 A | * | 4/1989 | Shimasaki et al. | 277/564 |
| 4,834,397 A | * | 5/1989 | Shimasaki et al. | 277/564 |
| 5,083,802 A | * | 1/1992 | Shimasaki et al. | 277/558 |
| 6,102,409 A | * | 8/2000 | Furuyama et al. | 277/559 |
| 6,123,514 A | * | 9/2000 | Kawaguchi et al. | 277/559 |

* cited by examiner

*Primary Examiner*—Anthony Knight
*Assistant Examiner*—Vishal Patel
(74) *Attorney, Agent, or Firm*—Jacobson Holman PLLC

(57) ABSTRACT

In a lip type seal, a case is tightly fitted and fixed to an inner circumferential surface of a housing through a gasket. A resin lip member constituted by an inner circumferential part extending in a bent state from a diameter direction part and its inner circumference to a sealed space side and forming a seal surface between an outer circumferential part of a rotary shaft and the resin lip member; a rear surface support plate disposed to abut on a rear surface of the diameter direction part of the resin lip member; and a stopper with a rear surface supported to a support surface of the housing through a second resin lip member and a second rear surface support plate and the top end coming close to or coming into contact with a rear surface of the inner circumferential part of the rear surface support plate, are provided on the inner circumference of the housing.

1 Claim, 2 Drawing Sheets

LIP TYPE SEAL

FIELD OF THE INVENTION

The present invention relates to a lip type seal which seals a circumference of a rotary shaft of various sorts of equipments.

PRIOR ART

FIG. 2 shows such a conventional lip type seal. In FIG. 2, a case 101 is tightly fitted and fixed to an inner circumferential surface of a housing 1 of the lip type seal through a gasket part 102a. A lip member 102 made of elastomer, a resin lip member 103 on the rear side of the lip member 102 and a second resin lip member 104 on the rear side thereof are held to the case 101. When a sealed space S becomes high in pressure, leakage of a fluid as the seal object is prevented. When the sealed space S becomes vacuum state, the vacuum state is held.

In a lip type seal 100 shown in FIG. 2, the lip member 102 on the closest side to the sealed space S is limited by a pressure durable reinforcing ring 105 arranged on the rear surface thereof in deformation due to pressure of the sealed space S. A spiral groove 102b producing pumping function in the leakage direction from the sealed space S by the rotation of the rotary shaft 2 is formed on an inner circumference sliding surface.

The resin lip member 103 disposed on the rear side of the lip member 102 made of elastomer is restricted in deformation in an axial direction by a diameter direction part 103a in the outer circumference being grasped between the pressure durable reinforcing ring 105 on the front side and the rear surface support plate 106 on the rear side. A spiral groove 103b producing a pumping function in the reverse direction to the leakage by the rotation of the rotary shaft 2 is formed on the inner circumference sliding surface.

The second resin lip member 104 arranged on the rear side of the resin lip member 103 is held in the state separated from the resin lip member 103 through an outer circumference spacer part 106a of the rear surface support plate 106 and a front surface support plate 107 disposed to abut on the rear end surface of the outer circumference spacer part 106a. The diameter direction part 104a is grasped between a second rear surface support plate 108 on the rear side of the diameter direction part 104a and the front surface support plate 107. Thereby, deformation in an axial direction is restricted. Also, when the lip type seal 100 is incorporated into the outer circumference of the rotary shaft 2, the front surface support plate 107 serves as a guide in which the second lip member 104 is bent at the inner circumference side.

According to the aforementioned conventional lip type seal, the rear surface of the second rear surface support plate 108 abuts on the end surface of the housing 1. Therefore, the second rear surface support plate 108 is not deformed to the side of the atmosphere A. However, in the rear surface support plate 106, only the outer circumferential part is constrained through the outer circumference space part 106a. Therefore, if high pressure acts on the front surface of the resin lip member 103, the rear surface support plate 106 is subjected to large load in an axial direction through the diameter direction part 103a of the resin lip member 103. As a result, the moment of the inner diameter side becomes large, and as shown in broken line in FIG. 2, the rear surface support plate 106 is greatly deformed in bending to the side of the atmosphere A.

Also, the inner diameter of the rear surface plate 106 and that of the second rear surface support plate 108 are formed into the minimum diameter considering the deviation of the rotary shaft 2 in a diameter direction and the maximum amount of the mounting eccentricity, in order that not entering of the resin lip member 103 into the gap G between the outer circumferential surface of the rotary shaft 2 and the rear surface plates 106, 108. Therefore, it is preferable that the gap G is made as small as possible. However, the inner diameter edge part 106b of the rear surface support plate 106 formed to bend to the side of the sealed space S, corresponding to the bending part of the resin lip member 103, is slightly displaced to the inner diameter side due to the aforementioned deformation to the side of the atmosphere A. Therefore, if the gap G is made small, the inner diameter edge part 106b may come into contact with the outer circumferential surface of the rotary shaft 2 being rotated. On account of such contact, abnormal sound may be produced or large torque may act on a gasket part 102a to produce slippage. Hence the lip type seal 100 may be broken.

SUMMARY OF THE INVENTION

An object of the present invention is to provide a lip type seal which prevents bending deformation of a rear surface support plate due to pressure of a sealed space and is excellent in pressure durability.

In a lip type seal according to one embodiment of the present invention, a case is tightly fitted and fixed to an inner circumferential surface of a housing through gasket means. A resin lip member constituted by an inner circumference seal part extending in a bent state from a diameter direction part and its inner circumference to a sealed space side and forming a seal surface between an outer circumferential surface of a rotary shaft and the resin lip member, a rear surface support plate disposed to abut on a rear surface of the diameter direction part of the resin lip member, and a stopper with a rear surface supported to the rising surface side of the housing and the top end coming close to or coming into contact with a rear surface of the inner circumferential part of the rear surface support plate, are provided on the inner circumference of the case.

In addition, "front surface" in the present specification means a surface facing the sealed space side, "rear surface" means a surface facing the opposite side of the sealed space, "front side" means the sealed space side, and "rear side" or "back side" means the opposite side of the sealed space.

DESCRIPTION OF EMBODIMENTS

Figure 1:
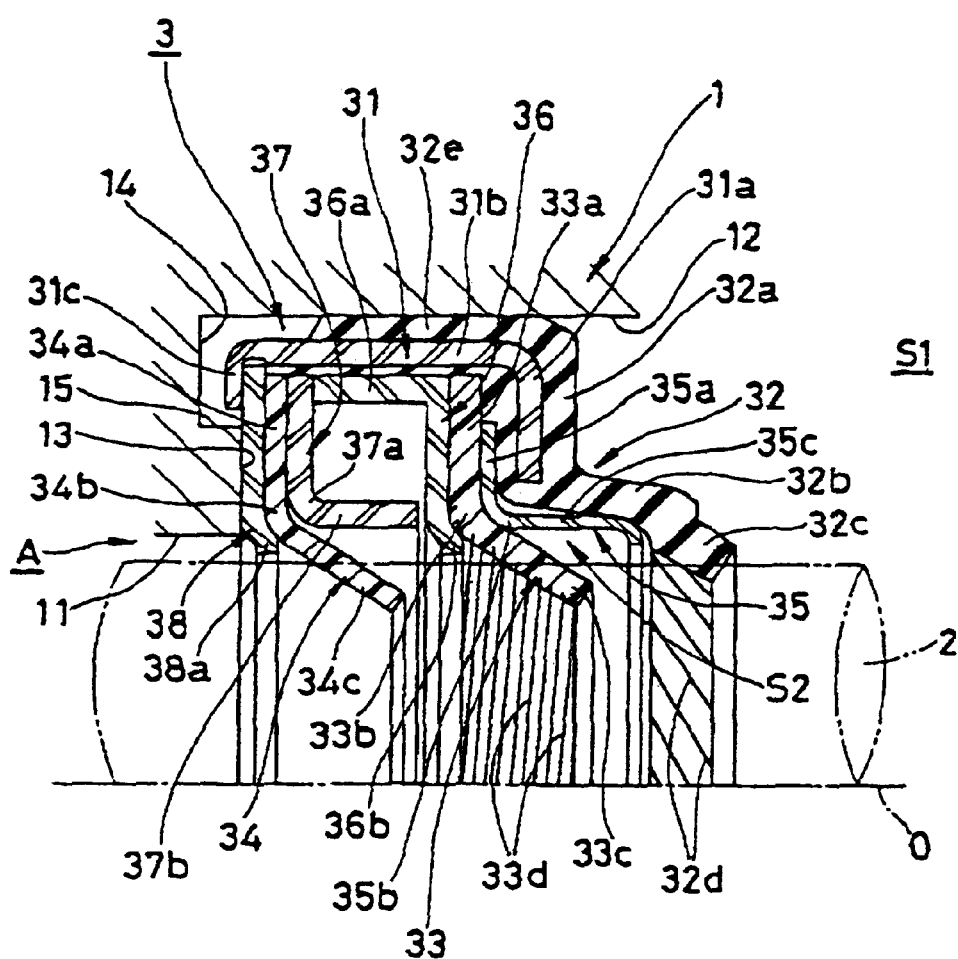
FIG. 1 is a semi sectional view of a preferred embodiment of a lip type seal according to the invention, shown by cutting with a plane passing through the axial center.
Figure 2:
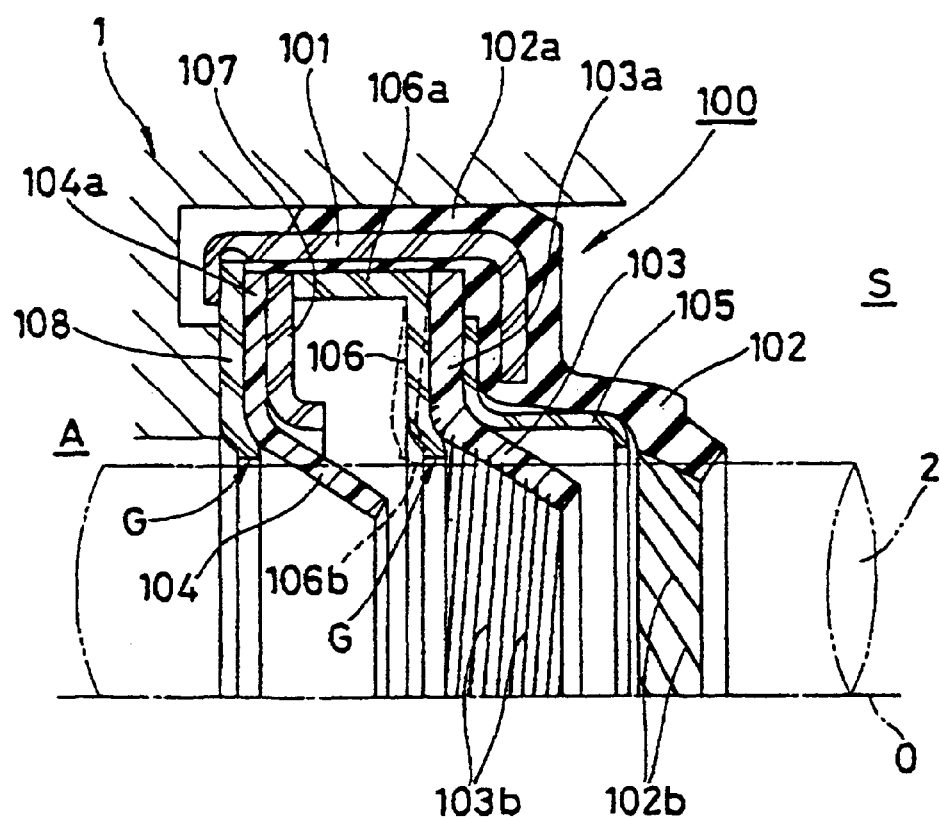
FIG. 2 is a semi sectional view of a conventional lip type seal, shown by cutting with a plane passing through the axial center.

FIG. 1 shows a preferred embodiment of a lip type seal according to the invention. In FIG. 1, reference numeral 1 designates a housing of a shaft hole part of an equipment, numeral 2 designates a rotary shaft which is loosely inserted in a shaft hole 11 of the housing 1 and is rotatable around the axial center O, and numeral 3 designates a lip type seal which is installed to a seal installation part 12 formed enlargingly from the shaft hole 11 in a diameter direction and seals a shaft circumference of the rotary shaft 2.

In the lip type seal 3, when the sealed space S1 becomes high in pressure, leakage of a fluid as the seal object is prevented. When the sealed space S1 comes to a vacuum state, the vacuum state is held. A lip member 32 made of elastomer (rubberlike elastic material), a resin lip member 33 on the rear side of the lip member 32 and a second lip member 34 are held.

More specifically, the lip member 32 made of elastomer is vulcanized and molded (vulcanization bonding) integrally in the state that its base part 32a embeds an inward flange part 31a formed at one end of an annular case 31 made of metal such as a steel material. The lip member 32 has a main body part 32b extending in an axial direction from the inner circumference of the base part 32a to the side of the sealed space S1, and an inner circumferential part 32c formed at the top end of the main body part 32b and brought into slidable contact with the outer circumferential surface of the rotary shaft 2. On the inner circumference sliding surface of the inner circumference seal part 32c, a spiral groove 32d having a directional property of producing the pumping function in a leakage direction from the sealed space S1 by the rotation of the rotary shaft 2, that is, to the left side in FIG. 1. Also, from the base part 32a, a gasket part 32e covering the outer circumferential side of the cylindrical main body part 31b in the case 31 is formed continuously.

A pressure durable reinforcing ring 35 made of metal such as a steel material is disposed to abut on the rear surface of the lip member 32 made of elastomer. The pressure durable reinforcing ring 35 limits the deformation of the lip member 32 made of elastomer due to pressure of the sealed space S1. The pressure durable reinforcing ring 35 has a diameter direction part 35a abutting on the rear surface of the base part 32a of the lip member 32, and a cylinder part 35c extending from the inner circumference of the diameter direction part 35a through a bent part 35b in the shape of arc and abutting on the inner circumferential surface of the main body part 32b of the lip member 32.

The resin lip member 33 is constituted by a sheet made of a synthetic resin of low friction such as PTFE (polytetrafluoroethylene). The resin lip member 33 has a diameter direction part 33a abutting on the rear surface of the base part 32a of the lip member 32 made of elastomer and the diameter direction part 35a of the pressure durable reinforcing ring 35, and an inner circumference seal part 33c extending from the inner circumference of the diameter direction part 33a through a bent part 33b in the shape of arc to the inner circumferential side of the cylinder part 35c in the pressure durable reinforcing ring 35. The inner circumference seal part 33c in the original state being not installed is formed in a taper shape such that the side of the bent part 33b with the diameter direction part 33a has a larger diameter than that of the rotary shaft 2 and the top end side has a smaller diameter than that of the rotary shaft 2. A spiral groove 33d having a directional property of producing the pumping function in the reverse direction of the leakage, that is, to the right side in FIG. 1, due to the rotation of the rotary shaft 2, is formed on the inner circumference sliding surface.

A rear surface support plate 36 is disposed to abut on the rear surface of the diameter direction part 33a in the resin lip member 33. The rear surface support plate 36 made of metal such as a steel material. From the outer diameter end part thereof, an outer circumference spacer part 36a extending in a cylindrical shape to the rear side is formed. An inner circumference edge part 36b is formed in a bent state to the side of the sealed space S1 corresponding to the bent part 33b of the resin lip member 33.

The second resin lip member 34 is made of a synthetic resin sheet of low friction such as PTFE. The second resin lip member 34 is formed in a similar shape to the resin lip member 33. The inner circumference sliding surface in the inner circumference seal part 34c becomes a flat surface without a spiral groove.

When the sealed space S1 comes to a vacuum state, the second resin lip member 34 functions as a pressure reduction seal to hold the vacuum state. A front surface support plate 37 is disposed to abut on the front surface of the diameter direction part 34a being the outer circumferential part of the second resin lip member 34. Also, a second rear surface support plate 38 is disposed to abut on the rear surface of the diameter direction part 34a.

The front surface support plate 37 is made of metal such as a steel material. Its rear surface abuts on the front surface of the diameter direction part 34a in the second resin lip member 34. The front surface of the outer diameter part abuts on the end part of the outer circumference spacer part 36a in the rear surface support plate 36. Thereby, when the sealed space S1 comes to a vacuum state, the second resin lip member 34 is prevented from being deformed and displaced due to pressure of the atmosphere, and the function as the pressure reduction seal is held. From the inner circumference of the front surface support plate 37, a stopper 37b extending through a bent part 37a in the shape of arc cylindrically in an axial direction is formed. The top end of the stopper 37b comes close to the rear surface in the vicinity of the inner diameter of the rear surface support plate 36 through a very small gap.

The second rear surface support plate 38 is made of metal such as a steel material, the second rear surface support plate 38 abuts on the rear surface from the diameter direction part 34a in the second resin lip member 34 to the bent part 34b of the inner circumference thereof. An inner diameter edge part 38a is formed in a bent state to the side of the sealed space S1 corresponding to the bent part 34b. Also, its inner diameter is formed into the minimum diameter considering the deviation of the rotary shaft 2 in the diameter direction ro the maximum amount of the assembling eccentricity.

On the end part on the rear side of the cylindrical main body part 31b in the case 31, a caulking part 31c bent by caulking to the inner circumferential side is formed. The pressure durable reinforcing ring 35, the resin lip member 33, the rear surface support plate 36, the front surface support plate 37, the second resin lip member 34 and the second rear surface support plate 38 are grasped in such a state that each outer circumferential part thereof is brought into close contact with each other between the rear surface of the base part 32a of the lip member 32 made of elastomer reinforced by the inward flange part 31a of the case 31 and the caulking part 31c.

On the other hand, between the shaft hole 11 of the housing 1 and the seal installation part 12 having a diameter larger than that of the shaft hole 11, a support surface 13 facing the side of the sealed space S1 and an annular recess 14 formed on the outer circumferential side in such a manner as to be retreated in an axial direction to the outer circumferential side of the support surface 13 are formed through an annular step difference part 15. The support surface 13 becomes a plane substantially crossing right angles to the axial center O. Its outer diameter (annular step difference part 15) is smaller than the inner diameter of the caulking part 31c of the case 31 in the lip type seal 3. Height in an axial direction of the annular step difference part 15, in other words, depth in an axial direction of the annular recess 14 is formed in the dimension larger than the thickness of the caulking part 31c.

In the lip type seal 3, the case 31 is force fitted to the inner circumference of the seal installation part 12 of the housing 1 through the gasket part 32e of the lip member 32 made of elastomer such that the rear surface of the second rear surface support plate 38 abuts on the support surface 13 in the housing 1. In this state, the caulking part 31c in the case 31 is loosely fitted to the annular recess 14 of the outer circumference of the support surface 13.

On the other hand, in the resin lip member 33 and the second resin lip member 34, the inner circumference seal parts 33c, 34c are deformed from the taper shape shown in FIG. 1 into a substantially cylindrical shape due to insertion of the rotary shaft 2 so as to be enlarged in diameter. The inner circumferential surface is brought into slidably contact with the outer circumferential surface of the rotary shaft 2. Then, the pressure durable reinforcing ring 35 becomes a guide so as to deform the resin lip member 33 into a cylindrical shape at the inner circumferential side of the bent part 33b. The front surface support plate 37 becomes a guide so as to deform the second resin lip member 34 into a cylindrical shape at the inner circumferential side of the bent part 34b. Also, the inner circumference sliding surface of the inner circumference seal part 32c of the lip member 32 made of elastomer is elastically brought into close contact with the outer circumferential surface of the rotary shaft 2, with a suitable squeeze.

The fluid pressure of the sealed space S1 functions such that the lip type seal 3 as a whole is pressed toward the side of the atmosphere A. In the lip type seal 3, the second rear surface support plate 38 abuts on the support surface 13 of the seal installation part 12 in the housing 1. Thereby, the deformation in an axial direction of the lip type seal 3 to the side of the atmosphere A is restricted. Therefore, the second rear surface support plate 38 is not subjected to the bending deformation. Consequently, the inner diameter can be formed to the minimum diameter considering the deviation of the rotary shaft 2 in a diameter direction or the maximum amount of the assembling eccentricity. Also, each of the lip members 32 to 34 is held in the normal installation position.

During the shaft rotation, if the pressure of the sealed space S1 rises, the pressure functions to reduce in diameter the main body part 32b of the lip member 32 made of elastomer. Since the part from the main body part 32b to the base part 32a is supported by the pressure durable reinforcing ring 35, the deformation in an inner diameter direction due to the pressure is limited.

The inner circumferential seal part 32c of the lip member 32 made of elastomer is not subjected to the support by the pressure durable reinforcing ring 35. During the shaft rotation, by the pumping function in the leakage direction of the spiral groove 32d formed in the inner circumference seal member 32c of the lip member 32 made of elastomer, a fluid as the seal object is introduced from the sealed space S1 into the space S2 between the lip member 32 made of elastomer and the resin lip member 33. A thick fluid lubrication film is formed in the part sliding relative to the rotary shaft 2 in the inner circumference seal part 32c. Also, the leakage of the fluid from the space S2 to the rear space of the resin lip member 33 is interrupted because the spiral groove 33d formed in the inner circumferential part 33c of the resin lip member 33 performs the pumping function in the reverse direction to the leakage.

Moreover, pressure competing with that in the sealed space S1 is produced within the back side space S2 of the lip member 32 made of elastomer according to the pumping function in the leakage direction of the spiral groove 32d of the lip member 32 made of elastomer and the pumping function in the leakage interrupting direction of the spiral groove 33d of the resin lip member 33. Consequently, the deformation in a diameter reducing state of the inner circumference seal part 32c of the lip member 32 made of elastomer due to the pressure of the sealed space S1 is suppressed and the sliding load is reduced.

During the shaft rotation, however, the interior of the back side space S2 of the lip member 32 made of elastomer comes to a high pressure state competing with the sealed space S1 as above described. On the other hand, in the rear surface support plate 36 supporting the rear surface of the diameter direction part 33a of the resin lip member 33, only the outer circumferential part thereof is restricted through the outer circumference spacer part 36a. Consequently, the high pressure acts on the front surface of the resin lip member 33, whereby large load in an axial direction is given through the diameter direction part 33a of the lip member 33. As a result, the inner circumferential part is subjected to the bending deformation to be displaced to the side of the atmosphere A.

According to the above-mentioned constitution of the present invention, however, the displacement in an axial direction of the inner diameter part of the rear surface support plate 36 to the side of the atmosphere A is limited by the abutting on the stopper 37b formed in the front surface support plate 37 at the back side. The load in an axial direction given to the stopper 37b by the abutting of the rear surface support plate 36 is received through the front surface support plate 37, the diameter direction part 34a of the second resin lip member 34 and the second rear surface support plate 38 to the support surface 13 in the housing 1. Therefore, the bending deformation of the rear surface support plate 36 is restricted, so that the inner diameter edge part 36b of the rear surface support plate 36 formed in a bent state corresponding to the bent part 33b of the resin lip member 33 is restricted in displacement to the inner diameter side with the foregoing bending deformation. Generating of abnormal sound due to the contact of the rotary shaft 2 with the outer circumferential surface, or the large torque acting on the gasket part 32e resulting in the slip with housing 1 or the breakage can be prevented effectively.

Also, in the rear surface support plate 36, the bending deformation of the inner diameter edge part 36b to be displaced to the inner diameter side is prevented by the stopper 37b. The inner diameter can be formed to the minimum considering the deviation of the rotary shaft in a diameter direction or the maximum amount of the assembling eccentricity. Consequently, entering of the bent part 33b of the resin lip member 33 in a gap between the inner diameter edge part 36b and the outer circumferential surface of the rotary shaft 2 due to the pressure of the space S2 can be prevented effectively.

Also, during the shaft stopping, the pumping function in a leakage interrupting direction by the spiral groove 33d of the resin lip member 33 is lost. However, since also the pumping in the leakage direction of the spiral groove 32d formed in the inner circumference seal part 32c of the lip member 32 made of elastomer is not performed, the pressure competing with sealed space S1 is not produced in the back side space S2 of the lip member 32 made of elastomer. Therefore, by the pressure of the sealed space S1 and the elasticity possessed by the elastomer, the inner circumference seal part 32c of the lip member 32 made of elastomer is brought into close contact with the outer circumferential surface of the rotary shaft 2 and the leakage of a fluid as the seal object from the sealed space S1 to the space S2 is interrupted.

In addition, the present invention is not limited to the embodiment as above described. For example, the present invention can be applied also to a lip type seal not having the lip member 32 made of elastomer as shown in FIG. 1 or to a lip type seal not having the second resin lip member 34 and the second rear surface support plate 38.

According to the lip type seal of the present invention, such bending deformation of the rear surface support plate supporting the rear surface of the resin lip member whose inner diameter part is displaced to the atmosphere side due to the pressure acting on the front surface of the resin lip member can be restricted by the stopper on the back side thereof. Also, such a state can be prevented that the inner diameter edge part of the rear surface support plate is brought into contact with the outer circumferential surface of the rotary shaft being rotated with the bending deformation and abnormal sound is produced or slippage between the gasket part and the housing is produced. Further, the breakage of the lip type seal can be prevented effectively. Also, in order to prevent the entering of the resin lip member due to pressure, the inner diameter of the rear surface support plate can be formed in the minimum diameter considering the deviation of the rotary shaft in the diameter direction or the maximum amount of the assembling eccentricity.

What is claimed is:

1. A lip type seal structure comprising:
   a housing (1) having a sealed space (S1) therein and an inner circumferential surface,
   a rotary shaft (2),
   a first lip member (32) having an inner circumferential seal part and an outer circumferential part,
   a second lip member (33) having an inner circumferential seal part,
   a third lip member (34) having an inner circumferential seal part,
   a pressure durable reinforcing ring (35) for reinforcing the first lip member (32),
   a first rear surface support plate (36) for supporting the second lip member (33),
   a front surface support plate (37) for supporting the third lip member (34),
   a second rear surface support plate (38) for supporting the third lip member (34),
   the first lip member (32), the second lip member (33) and the third lip member (34) being arranged in order between the sealed space (S1) and atmosphere (A),
   the outer circumferential part of the first lip member (32) being fixed to the inner circumferential surface of the housing (1),
   the second lip member (33) having the inner circumference seal part extends bendingly from a diametral direction part toward the sealed space (S1) and forms a seal between the rotary shaft (2) and the first lip member (32),
   the third lip member (34) being located between the second rear surface support plate (38) and the front surface support plate (37) so that the third lip member (34) forms a seal between the second lip member (33) and the atmosphere (A),
   the pressure durable reinforcing ring (35) being located between a rear surface of the first lip member (32) and the second lip member (33) and limiting deformation of the first lip member (32),
   the rear support plate (36) being located between the second lip member (33) and the front support plate (37) and limiting deformation of the second lip member (33),
   the second rear surface support plate (38) being located between the third lip member (34) and a support surface of the housing (1) facing in an axial direction so as to limit deformation of the third lip member (34),
   the front surface support (37) being located between the first rear surface support plate (36) and the third lip member (34) and including a stopper extending adjacent to a rear surface of the inner circumferential part of the first rear surface support plate (36) for preventing the first rear surface support plate (36) from contacting the rotary shaft.

* * * * *